United States Patent
Back et al.

(10) Patent No.: US 6,515,690 B1
(45) Date of Patent: Feb. 4, 2003

(54) SYSTEMS AND METHODS PROVIDING AN INTERFACE FOR NAVIGATING DYNAMIC TEXT

(75) Inventors: Maribeth J. Back, San Francisco, CA (US); Steven R. Harrison, Portola Valley, CA (US); Richard J. Goldstein, Menlo Park, CA (US); Matthew G. Gorbet, San Francisco, CA (US); Scott L. Minneman, San Francisco, CA (US); Jonathan R. Cohen, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/512,886

(22) Filed: Feb. 25, 2000

(51) Int. Cl.[7] .................................................. G09G 5/00
(52) U.S. Cl. ...................................... 345/866; 434/178
(58) Field of Search .......................... 345/774; 434/169, 434/178, 179, 180, 307 R; 704/1

(56) References Cited

U.S. PATENT DOCUMENTS

| | | | | |
|---|---|---|---|---|
| 5,404,440 A | * | 4/1995 | Asahi | 345/746 |
| 6,056,551 A | * | 5/2000 | Marasco | 434/178 |
| 6,113,394 A | * | 9/2000 | Edgar | 434/118 |
| 6,353,824 B1 | * | 3/2002 | Boguraev et al. | 704/9 |
| 6,409,513 B1 | * | 6/2002 | Kawamura et al. | 434/178 |

OTHER PUBLICATIONS

International Institute for Sustainable Developement. IISDnet. Dashboard Version 1.1. Oct. 1999.*

"AceReader", Stepware, Inc., http://www.stepware.com/acereader.html, Jan. 7, 2000.

"Typographic Space", David Small et al., Visible Language Workshop; http://www.media/mit.edu/people/ds . . . publications/TypographicSpace.html, Jan. 7, 2000.

"Technical Manual CIB–1000", HappControls, Inc., http://www.happcontrols.com/products/ctlinterfaces/cib1000.html, Feb. 7, 2000.

"Maeda Studio", John Maeda, www.maedastudio.com/, Jan. 7, 2000.

"An Architecture for Content Analysis of Documents and its Use in Information and Knowledge Management Tasks", Branimir Boguraev et al., SIGCHI, vol. 30, No. 2, Apr. 1998.

"Dynamic Document Presentation", Branimir Boguraev et al., SIGCHI, vol. 30, No. 2, Apr. 1998.

"'Up, Up and Away . . . ': Intuitive Flight Through Virtual Worlds", Joshua Bers et al., Advanced Human Interface Group.

* cited by examiner

Primary Examiner—John Cabeca
Assistant Examiner—Brian Detwiler
(74) Attorney, Agent, or Firm—Oliff & Berridge, PLC

(57) ABSTRACT

By using dynamic text and an interface utilizing a familiar metaphor, reading speed and comprehension can be increased. In particular, the interface, which is based on a familiar metaphor, such as driving, allows a user to concentrate on the real task at hand, reading, as opposed to manipulation of the interface. Thus, using a combination of a familiar metaphor and rapid serial presentation, dynamic text can be efficiently negotiated.

40 Claims, 3 Drawing Sheets

SYSTEMS AND METHODS PROVIDING AN INTERFACE FOR NAVIGATING DYNAMIC TEXT

BACKGROUND OF THE INVENTION

1. Field of Invention

This invention provides a tool to aid with reading. In particular, this invention is directed towards systems and methods toward improving reading skills through the use of dynamic text.

2. Description of Related Art

A plethora of techniques and software are available to aid an individual in improving their reading skills and/or comprehension. In particular, AceReader® by StepWare, Inc.™ utilizes either rapid serial visual presentation (RSVP) or tachistoscopic scroll presentation to reduce subvocalization and re-reading. Typographic Space is a software tool that facilitates investigation of the use of interactive three-dimensional stereo graphics as a medium for typographic communication.

SUMMARY OF THE INVENTION

While current reading speed and comprehension systems work well in an abstract sense, this technology can be daunting and awkward to use and a user is required to familiarize themselves with each particular system's interface before the true task at hand can be accomplished.

Accordingly, the systems and methods of this invention combine a familiar metaphor with a dynamic text presentation scheme. In particular, the systems and methods of this invention leverage people's knowledge of the familiar activity of, for example, driving an automobile, to allow them comfortable and intuitive access to a possibly less familiar realm of interactive text. Thus, the hurdles associated with familiarizing and learning a new interface with which to navigate dynamic text are overcome, and a user can concentrate on the text itself.

In combination with a familiar metaphor, the systems and methods of this invention combine dynamic text with rapid serial visual presentation (RSVP). Dynamic text allows for visual manipulation of document content over time. This adds a new expressive dimension which can be used to assimilate content contained in the document. For example, Dynamic Document Presentation, by Boguraev et al, 1998, incorporated herein by reference in its entirety, discusses how dynamic text enhances the semantic structure of documents. Supplementing the dynamic text aspects of the systems and methods of this invention, rapid serial visual presentation allows users to increase their reading speed and comprehension. For a more detailed discussion of rapid serial visual presentation see "Rapid Serial Visual Presentation (RSVP): a method for studying language processing" D. Kieras, 1984, incorporated herein by reference in its entirety. In particular, people read printed words on a page in saccadic jumps. Saccadic jumps are a series of somewhat erratic eye motions around a page. Rapid serial visual presentation is a type of dynamic topography where words or short phrases appear in sequence and, for example, on one spot on a computer screen. As the words continually flash in one spot, the reader is not required to move their eye, thus, avoiding the time used in moving and refocusing the eyes. Using this presentation technique, people have been known to increase their reading speed up to 2000 words per minute. This is comparison with the printed page, which an average fast reader reads at only about 400–600 words per minute. Thus, speed is not the only affordance of this method, rapid serial visual presentation and other forms of dynamic text allow the perusal of large amounts of text in a very limited screen space, which is a common design constraint in computational systems.

The systems and methods of this invention recognize three factors that aid in improving a reader's speed and comprehension. First, a user must be able to navigate the dynamic text. In particular, a user must be able to choose what stream of dynamic text to read, how to access different parts of it, how to replay it, and how to control its speed. A familiar interface, such as the driving metaphor, provides users with a familiar set of controls to navigate through a changing landscape (textscape). Specifically, a user, for example, sits in front of a graphical window on a computer monitor. This graphical window displays the dynamic text. A speedometer, which can appear in the graphical window, measures words per minute. A steering wheel updates the reader's perspective on the Graphic window, moving between streams, or topics, of text. The gear shift shifts selects the subject matter and the gas pedal, which could be controlled by a users foot, controls the rate at which words are displayed. Furthermore, the metaphor can include control buttons, such as a repeat button to return to the beginning of, for example, a predetermined portion of text, a sentence or a paragraph, a reset button which, for example, could allow the user to jump back to the beginning of the text stream and a cruise control device that could, for example, maintain the text stream display speed.

Secondly, punctuation plays an important role in assimilating dynamic text. In particular, content appropriate rhythms can greatly increase speed and comprehension in both rapid serial visual presentation and dynamic text presentation. Rhythm in this case can mean not only the relative lengths of time that words or phrases stay on the screen, but repeating patterns of color or size or font, or even background color or texture.

Thirdly, the design and display of an appropriate typographical scheme also aids in comprehension and speed of the dynamic text. For example, font size, color, background color and color related to punctuation are all capable of affecting reading speed and comprehension.

Accordingly, systems and methods of this invention combine a familiar metaphor with other techniques of assembling and displaying text in order to allow a user to more quickly navigate, read and assimilate streams of information. Specifically, a familiar metaphor, such as driving a car, is designed into a graphical user interface or dedicated piece of equipment such as a "video reading game." The controls associated with the metaphor, for example, an accelerator, a gear shift and a steering wheel, allow a user to navigate through portions of dynamic text. Other possible metaphors include, for example, piloting a jet, using the throttle for speed and the yoke to navigate, flying like a bird, using detected arm motion, flapping for speed and banking left or right for direction, as described in "Up, Up and Away": Intuitive Flight Through Virtual Worlds" by Bers, incorporated herein by reference in its entirety, squeezing a toy, the harder the squeeze the faster the text display speed, and navigation via accelerometer data, or the like.

This invention provides systems and methods that enhance a user's reading comprehension skills.

This invention separately provides systems and methods that improve a user's reading speed.

This invention separately provides systems and methods that combine a familiar metaphor with dynamic text.

This invention separately provides systems and methods that allow users to navigate streams, or "lanes," of text using a driving metaphor.

This invention additionally provides systems and methods that allow a user to navigate dynamic text through a user interface having a familiar metaphor.

This invention additionally provides systems and methods that allow a user to navigate dynamic text through a "video game" type interface.

The systems and methods of this invention could also be used to allow handicapped or elderly people to read large amounts of text without having to move their heads, eyes or hands. For example, the controllers can be adapted for the handicapped so that they are used by the hands rather than the feet. Thus, the controllers can be adjusted to fit the needs of the particular person. For example, if a user's hands are disabled by arthritis, the user is relieved of the necessity of turning book pages. If a user's eyes do not distinguish fine detail well, the font sizes and/or colors can be adjusted. Furthermore, speech can be swiftly translated to text and displayed for those who are hard of hearing. This could be particularity useful in a telecommunications environment where the telephone is a notoriously difficult device for the hearing impaired to manipulate.

Systems and methods of this invention use a familiar interface, such as a driving metaphor, to manipulate text on a display. The text can be controlled in terms of content, presentation speed and subject matter. Furthermore, content can be repeated or restarted.

The systems and methods of this invention off-load activities from a reader's over-taxed cognitive system to under-utilized areas, such as the peripheral ranges of the reader's senses. The systems and methods of this invention enable a user to control a text stream while very little attention need be dedicated to manipulating a particular user interface. The systems and methods of this invention engage a wider range of human perception and enable a larger degree of low-intentional interaction than is found in current reading enhancement systems. The systems and methods of this invention recognize that a direct physical action with a familiar interface can be more efficient and reliable than interactions with abstract, unfamiliar user interfaces.

For example, pressing an accelerator to increase word speed is more easily accomplished than finding and adjusting word speed in, for example, a graphical control window.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following Figures, wherein.

DETAILED DESCRIPTION OF PREFERRED EMBODIMENTS

Navigation of dynamic text through the dynamic text navigation systems and methods according to this invention reduce the amount of attention required to manipulate the text, and allow more attention to be dedicated to the real task at hand, reading. Through the use of a familiar metaphor, and corresponding interface, a user selects, for example, with a gear shift, the subject matter to read. Upon selecting the subject matter and display characteristics, a user navigates between one or more streams, or "lanes," of text through the use of, for example, a steering wheel. Upon selecting a particular text stream for viewing, the user depresses, for example, an accelerator pedal, which begins "feeding" the selected text stream to the user. As the text stream is displayed to the user, a word count meter, such as a speedometer, counts the number of words displayed on a screen. Then, at anytime during the operation of the dynamic text navigation systems and methods according to this invention, a user can switch text streams, subject matter, display characteristics, or repeat a portion of a text stream through the use of the steering wheel, gear shift, and repeat button, respectively.

Figure 1:
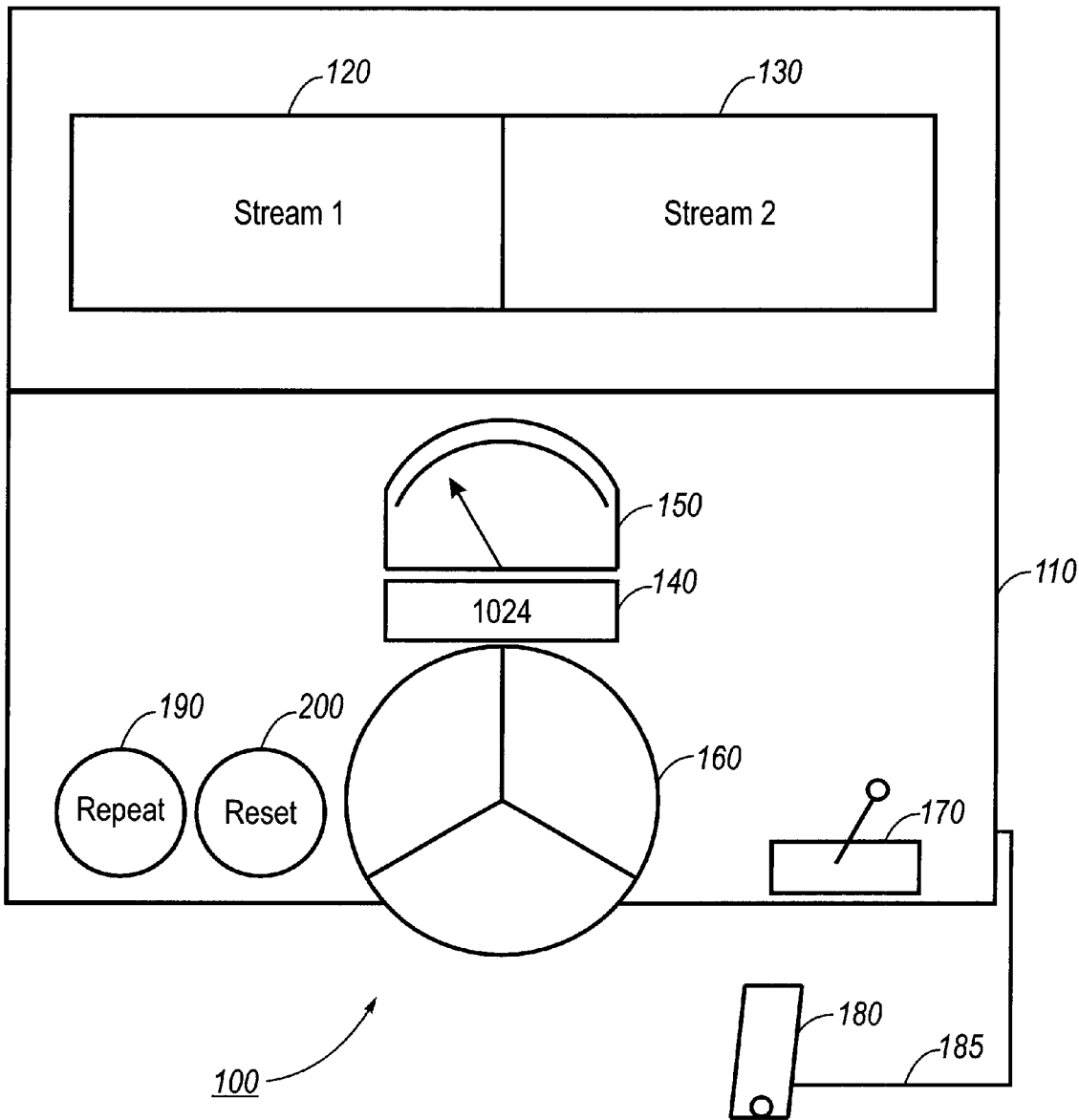
FIG. 1 illustrates an exemplary user interface according to this invention.

FIG. 1 illustrates the components of the user interface 100 for the dynamic text navigation system. In particular, the user interface 100 comprises a display 110, one or more text stream display portions 120 and 130, a word count display box 140, a reading speed gauge 150, a text stream selection device 160, a subject selection device 170, a text speed control device 180, connected via link 185, a text repeat device 190 and a text reset device 200. Additionally, the display 110 can alternatively comprise a subject display portion and/or additional display portions for displaying information pertaining to, for example, the length of the text stream, the source of the text stream and/or the percentage read of the one or more documents (not shown).

In this illustrative embodiment, the metaphor is that of an automobile. In particular, the text stream selection device 160 is represented as a steering wheel, the subject selection device 170 as a gear shift, the text speed controller 180 as an acceleration pedal and the one or more text stream display portions 120 and 130 appearing as "content" or "lanes" displayed in the "windshield."

The one or more text stream display portions 120 and 130 display the dynamic text selected by the subject selector device 170 and the text stream selection device 160. The source of this dynamic text can be any source of text including, for example, a book, a magazine, an e-mail, web page content, an article, a news feed, an information feed, a speech to text system, or the like. Furthermore, the "windshield" of the dynamic text navigation system can also include a portion (not shown) that displays the subject, or a summary thereof, of the document displayed in the dynamic text navigation system 100.

FIG. 1 illustrates an exemplary user interface that can be used with the dynamic text navigation system 100 of this invention. This exemplary interface can be displayed on, for example, a computer as a graphical user interface, wherein each of the components are selected, for example, with a click of a mouse. Alternatively, the user interface 100 seen in FIG. 1 can represent a dedicated dynamic text navigation system wherein, for example, the steering wheel 160, the gear shift 170, the accelerator 180, and the repeat and the reset buttons 190 and 200, respectively, are physical controls, such as those on a video game. Alternatively, the dynamic text navigation system 100 seen in FIG. 1 can be any combination of graphical user interfaces and hardware components that allow for navigation through dynamic text as discussed above.

Figure 2:
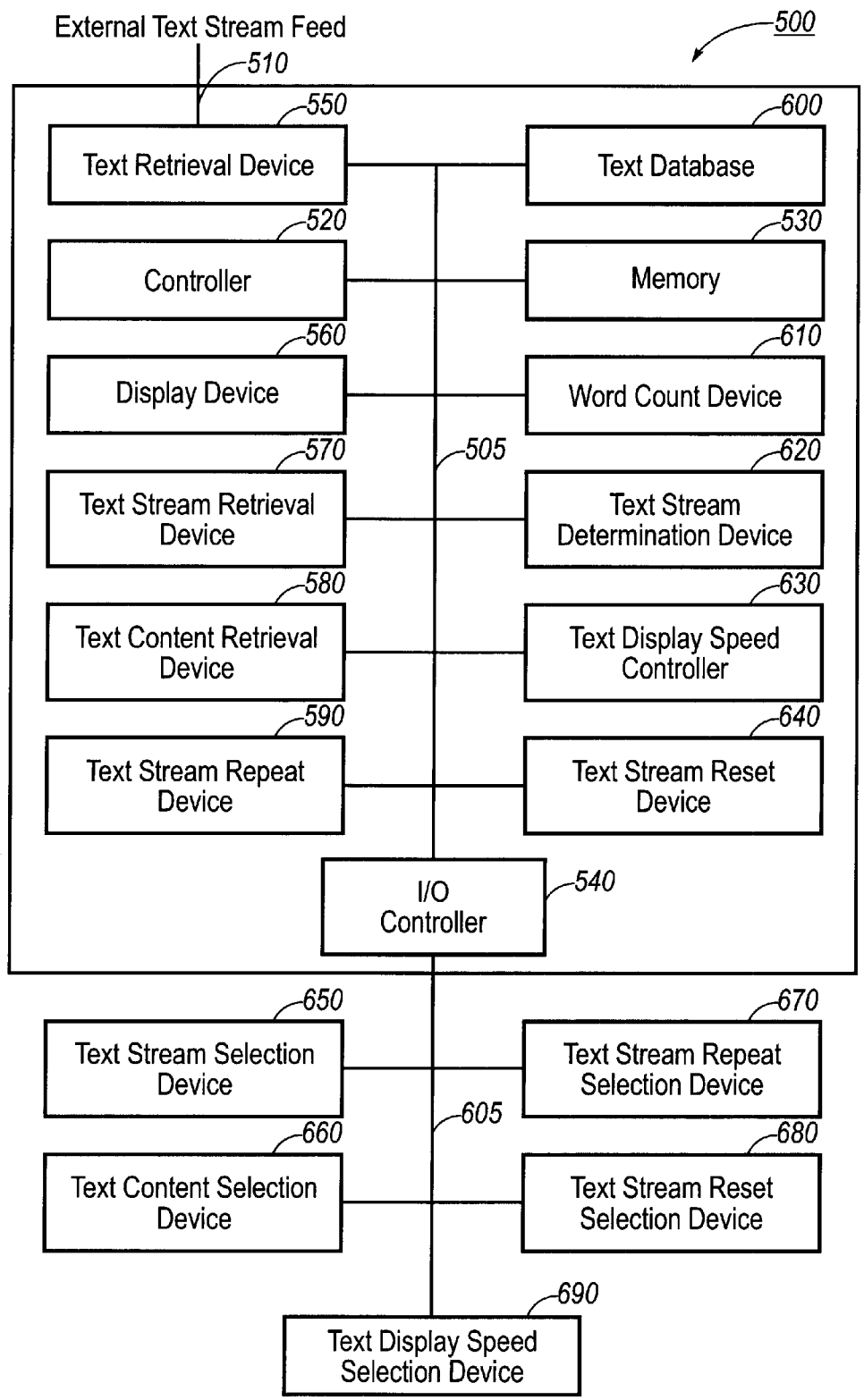
FIG. 2 is a functional block diagram showing a first embodiment of a dynamic text navigation system according to this invention.

FIG. 2 illustrates the components of the dynamic text navigation system 500. Specifically, the dynamic text navigation system 500 comprises a controller 520, a memory 530, an I/O controller 540, a text retrieval device 550, a display device 560, a text stream retrieval device 570, a text content retrieval device 580, a text stream repeat device 590, a text database 600, a word count device 610, a text stream determination device 620, a text display speed controller 630 and a text stream reset device 640. In addition, input devices, including a text stream selection device 650, a text content selection device 660, a text stream repeat selection device 670, a text stream reset selection device 680, a text display speed selection device 690 and an external text stream feed 510 are connected to the dynamic text navigation system. The various components of the dynamic text navigation system are interconnected by links 505 and 605.

In operation, a user, via the text content selection device 660, selects the content and typographical graphical data of the text to be displayed on the display device 560. The content can be retrieved from either, or a combination of, the text database 600 or the external text stream feed 510, via the text retrieval device 550. In particular, the text database 600 can store one or more documents that can be displayed by the dynamic text navigation system according to this invention. Alternatively, content can be retrieved from, for example, the Internet or an e-mail, via the external text stream feed 510. The external text stream feed 510 can be, for example, a connection to an intranet, the Internet, or other distributed network. For example, the external text stream feed 510 could be a server push that "feeds" text to the dynamic text navigation system according to this invention. Alternatively, text retrieval can be initiated by the text retrieval device 550 and "pulled" from one or more collocated or non-collocated text databases (not shown) located on a distributed network.

Next, and in cooperation with the display device 560, the controller 520 and memory 530, one or more indicators of text streams, and text display properties, that are available are presented on the display device 560. These indicators represent the text streams that correspond to the content selected by the user with the text content selection device 660. Then, via the text stream selection device 650, the user selects one of the text streams for display on the display device 560. For example, and in the exemplary user interface embodiment, the selected text stream can be highlighted or otherwise visually altered to indicate its selection.

If the content selected by the user via the text content selection device 660 contains more than one text stream, the text stream determination device 620 displays one or more representations of the available text streams on the display device 560. Then, as previously discussed, the user selects the desired text stream via the text stream selection device 650, in cooperation with I/O controller 540, the controller 520, the memory 530 and display device 560.

After a user has selected a text stream for reviewing, the user engages the text display speed selection device 690. The text display speed selection device 690, in cooperation with the text display speed controller 630, and the text stream retrieval device 570, retrieves the text to be displayed on the display device 560 from either, or a combination of, the text database 600 and the external text stream feed 510. Then, analogous to the accelerator pedal on an automobile, the text display speed selection device 690 increases or decreases the speed at which the text is displayed on display device 560. The selected text stream can be displayed in a rapid serial visual presentation type format, a tachistoscopic scroll, or the like.

As text is displayed on display device 560, the word count device 610, in cooperation with controller 520 and memory 530 counts each word displayed on the display device 560. The word count determined by the word count device 610 can be displayed in either, or a combination of, analog format via, for example, the reading speed gauge 150 or, alternatively, in digital format via, for example, the text count display 140.

The text stream repeat selection device 670, in cooperation with the text stream repeat device 590 allows a user to have a portion of the text stream repeated on the display device 560. This repeat function can be set to either a predetermined word count, for example, the last ten words, or can be selected by a user based on a particular user's desires. Therefore, if the user selected the text stream repeat selection device 670 twice, the dynamic text navigation system 500 could, for example, repeat the last twenty words of the text stream.

The text stream reset selection device 680 allows for a restarting of the text stream in cooperation with the text stream reset device 640. In particular, the text stream reset selection device 660 returns the selected text stream to the beginning of that text stream.

It is to be appreciated that the text stream selection device 650, the text content selection device 660, the text stream repeat selection device 670, the text stream reset selection device 680 and the text display speed selection device 690 can be either widgets within a graphical user interface or physical component, such as potentiometers and a mouse, or a combination thereof.

Furthermore, and with reference to the Happ Controls Control Interface Board CIB-1000, the systems and methods of this invention have been implemented to run on a personal computer. Specifically, the Happ Controls Control Interface Board Technical Manual, incorporated herein by reference in its entirety, describes an interface that is located between any control, such as the text stream selection device or the text content selection device, and a personal computer. The Happ Controls Interface Board allows for 16 digital I/O signals, 6 digital input signals and 4 filtered analog input signals. Thus, in an exemplary working embodiment of the dynamic text navigation system, a Java 2 program that uses XML specifies and selects the text in the dynamic text navigation system as well as assembles the layout and typographical qualities of the text stream. The Java program parses the serial data from the A/D converter, received from on or more of the user controls, and uses the data to affect the text on a screen. Size, color, font and background color of the text is determined by the XML file and is authored along with the content of each line of text, selected by a user, or a combination thereof. Additionally, images or animations may be incorporated as illustrations within the text from time to time, which can also be controlled by the XML file.

The links 185, 505 and 605 can be any wired or wireless link or any other known or later developed element(s) that is capable of supplying electronic data to and from the connected elements.

Figure 3:
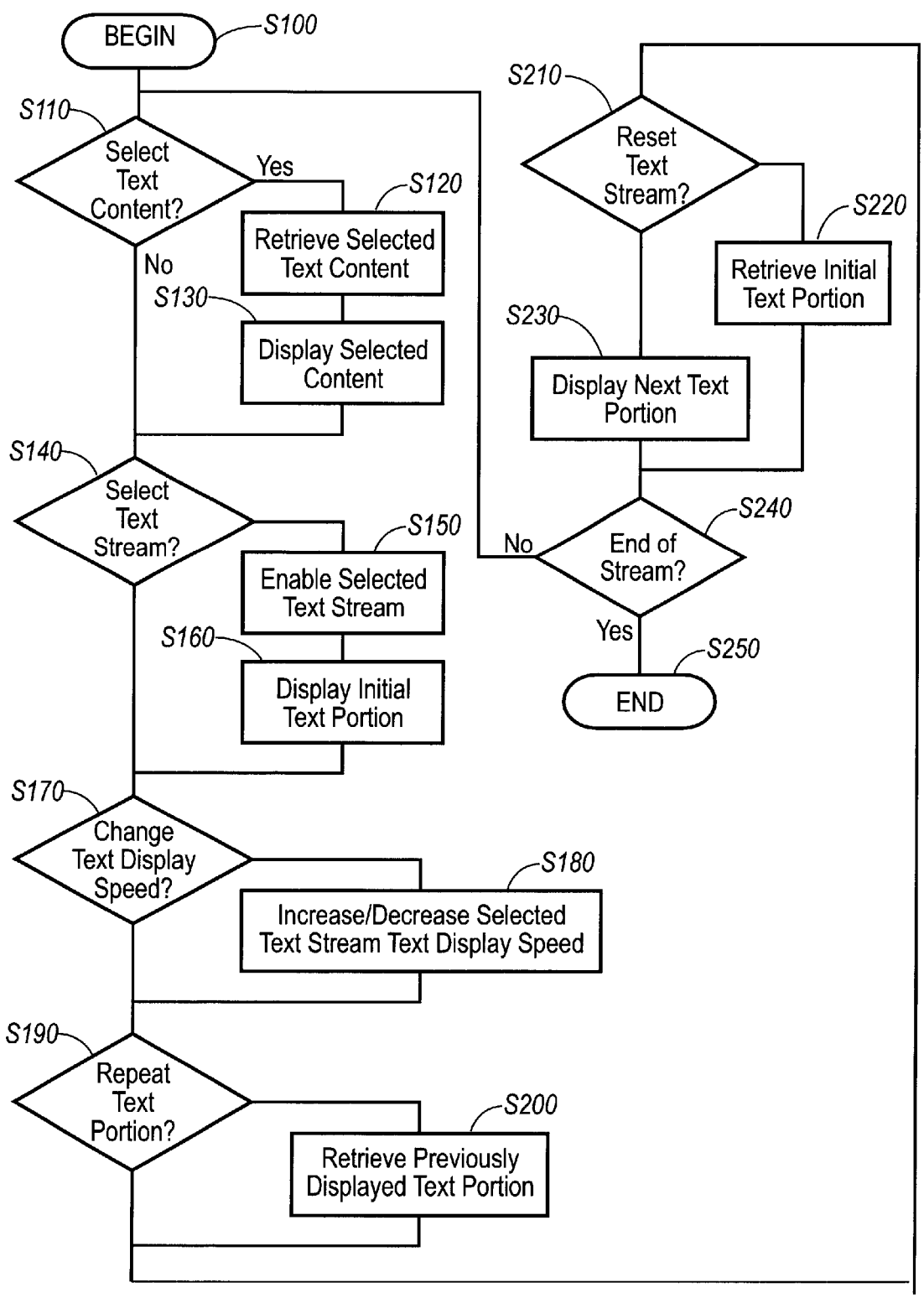
FIG. 3 is a flow chart outlining one embodiment of a method for navigating dynamic text according to this invention.

FIG. 3 illustrates the operation of the dynamic text navigation system according to this invention. Specifically, control begins in step S100. Control then continues to step S110, where a determination is made whether to select text content and typographical graphical data. If text content is selected, control continues to step S120. Otherwise, control jumps to step S140.

In step S120, the selected text content is retrieved. Then, in step S130, the selected content is displayed. Control then continues to step S140.

In step S140, a determination is made whether to select a particular text stream. If a text stream is been selected, control continues to step S150. Otherwise, control jumps to step S170.

In step S150, the selected text stream is enabled. Then, in step S160, the initial text portion is displayed. Control then continues to step S170.

In step S170, a determination is made whether the text display speed is to be adjusted. If the text display speed is to be adjusted, control continues to step S180 where the selected text stream text display speed is increased/decreased as appropriate. Control then continues to step S190.

In step S190, a determination is made whether to repeat a text portion. If a text portion is repeated, control continues to step S200 where the previously displayed text portion is retrieved and displayed. Control then continues to step S210.

In step S210, a determination is made whether to reset the text stream. If the text stream is reset, control continues to step S220 where the initial text portion is retrieved and displayed. Control then continues to step S230.

In step S230, the next text portion is displayed. Next, in step S240, a determination is made whether the end of the text stream has been encountered. If the end of the text stream has been encountered, control continues to step S250 where the control sequence ends Otherwise, control jumps back to step S110.

As shown in FIGS. 1–2, the dynamic text navigation system is preferably implemented either on a single program general purpose computer or separate program general purpose computers, with associated text content and speed selection devices. However, the dynamic text navigation system can also be implemented on a special purpose computer, a programmed microprocessor or microcontroller and peripheral integrated circuit element, an ASIC or other integrated circuit, a digital signal processor, a hard-wired electronic or logic circuit such as a discrete element circuit, a programmable logic device such as a PLD, PLA, FPGA or PAL, or the like. In general, any device, capable of implementing a finite state machine that is in turn capable of implementing the flow chart shown in FIG. 3 can be used to implement the dynamic text navigation system according to this invention.

Furthermore, the disclosed method may be readily implemented in software using object or object-oriented software development environments that provide portable source code that can be used on a variety of computer or work station hardware platforms. Alternatively, the disclosed dynamic text navigation system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The dynamic text navigation systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as Java® or CGI script, as a resource residing on a server or graphics work station, as a routine embedded in a dedicated dynamic text navigation system, web browser, web TV interface, video game, PDA interface, or the like. The dynamic text navigation system can also be implemented by physically incorporating the systems and methods into a software and/or hardware system, such as the hardware and software systems of a personal computer or dedicated dynamic text navigation system.

It is, therefore, apparent that there has been provided in accordance with the present invention, systems and methods for navigating dynamic text. While this invention has been described in conjunction with preferred embodiments thereof, it is evident that many alternatives, modifications and variations be apparent to those skilled in the art. Accordingly, Applicants intend to embrace all such alternatives, modifications and variations that follow in the spirit and scope of this invention.

What is claimed is:

1. A text stream display system comprising:
   a text content retrieval device that retrieves a selected text content;
   a display device that displays a text stream of the selected text content; and
   a set of physical controls that control for displaying characteristics of the text stream, in a manner corresponding to a metaphor of a direct physical activity performed by a user.

2. The system of claim 1, further comprising at least one selectable content display portion that displays content information and at least one selectable text stream.

3. The system of claim 2, further comprising a text content selection device that selects the at least one selectable content display portion.

4. The system of claim 1, further comprising a text stream selection device that selects the text stream.

5. The system of claim 1, further comprising a word count device that counts at least one word displayed on the display device.

6. The system of claim 1, further comprising a text display speed characteristic selection device that controls a display speed of the text stream.

7. The system of claim 1, further comprising a text stream repeat characteristic selection device that redisplays a portion of the text stream.

8. The system of claim 1, further comprising a text stream reset characteristic selection device that restarts the text stream.

9. The system of claim 1, wherein the text stream is retrieved from at least one of a text database and a text stream feed.

10. The system of claim 1, wherein the text stream is displayed in at least one of a rapid serial visual presentation type format and a tachistoscopic scroll.

11. The system of claim 1, wherein the metaphor is at least one of driving a car, piloting an airplane, flying like a bird and interacting with a toy.

12. The system of claim 1, wherein the selected at least one text stream is dynamic text.

13. The system of claim 12, wherein the dynamic text can be derived from any source of text including a document, a book, a magazine, an e-mail, web page content, an article, a news feed, an information feed and a speech-to-text system.

14. The system of claim 1, wherein the display characteristics comprise at least one of text display speed, text size, text color and text background.

15. A method for displaying dynamic text comprising:
   selecting a text content;

retrieving the selected text content; and displaying a text stream of the selected text content, wherein a set of physical controls that control the display characteristics of the text stream in a matter corresponding to a metaphor of a direct physical activity performed by a user.

16. The method of claim 15, further comprising displaying at least one selectable content display portion that displays content information.

17. The method of claim 16, further comprising selecting the at least one selectable content display portion.

18. The method of claim 15, further comprising selecting the text stream.

19. The method of claim 15, further comprising counting at least one displayed word.

20. The method of claim 15, further comprising controlling a display speed of the text stream.

21. The method of claim 15, further comprising redisplaying a portion of the text stream.

22. The method of claim 15, further comprising restarting the text stream.

23. The method of claim 15, wherein the text stream is retrieved from at least one of a text database and a text stream feed.

24. The method of claim 15, wherein the text stream is displayed in at least one of a rapid serial visual presentation type format and a tachistoscopic scroll.

25. The method of claim 15, wherein the personal interaction metaphor is at least one of driving a car, piloting an airplane, flying like a bird and interacting with a toy.

26. The method of claim 15, wherein the dynamic text can be derived from any source of text including a document, a book, a magazine, an e-mail, web page content, an article, a news feed, an information feed and a speech-to-text system.

27. The method of claim 15, wherein the display characteristics comprise at least one of text display speed, text size, text color and text background.

28. A machine readable information storage media having information for displaying dynamic text comprising:

information that selects a text context;

information that retrieves a text stream of the selected text content; and information that displays the text stream, wherein the information is related to a set of physical controls that control the display characteristics of the text stream in a manner corresponding to a metaphor of a direct physical activity performed by a user.

29. The information storage media of claim 28, further comprising information that displays at least one selectable content display portion that displays content information.

30. The information storage media of claim 29, further comprising information that selects the at least one selectable content display portion.

31. The information storage media of claim 28, further comprising information that selects the text stream.

32. The information storage media of claim 28, further comprising information that counts at least one displayed word.

33. The information storage media of claim 28, further comprising information that controls a display speed of the text stream.

34. The information storage media of claim 28, further comprising information that redisplays a portion of the text stream.

35. The information storage media of claim 28, further comprising information that restarts the text stream.

36. The information storage media of claim 28, wherein the text stream is retrieved from at least one of a text database and a text stream feed.

37. The information storage media of claim 28, wherein the text stream is displayed in at least one of a rapid serial visual presentation type format and a tachistoscopic scroll.

38. The information storage media of claim 28, wherein the personal interaction metaphor is at least one of driving a car, piloting an airplane, flying like a bird and interacting with a toy.

39. The information storage media of claim 28, wherein the dynamic text can be derived from any source of text including a document, a book, a magazine, an e-mail, web page content, an article, a news feed, an information feed and a speech-to-text system.

40. The information storage media of claim 28, wherein the display characteristics comprise at least one of text display speed, text size, text color and text background.

* * * * *